US008818390B2

(12) United States Patent
Honjo

(10) Patent No.: US 8,818,390 B2
(45) Date of Patent: Aug. 26, 2014

(54) RADIO BASE STATION AND RADIO COMMUNICATION METHOD

(75) Inventor: Makoto Honjo, Yokohama (JP)

(73) Assignee: Kyocera Corporation, Kyoto (JP)

( * ) Notice: Subject to any disclaimer, the term of this patent is extended or adjusted under 35 U.S.C. 154(b) by 667 days.

(21) Appl. No.: 12/670,396

(22) PCT Filed: Jul. 23, 2008

(86) PCT No.: PCT/JP2008/063192
§ 371 (c)(1),
(2), (4) Date: Jun. 3, 2010

(87) PCT Pub. No.: WO2009/014141
PCT Pub. Date: Jan. 29, 2009

(65) Prior Publication Data
US 2010/0267396 A1    Oct. 21, 2010

(30) Foreign Application Priority Data

Jul. 23, 2007  (JP) ................................. 2007-191167

(51) Int. Cl.
*H04W 72/00* (2009.01)
(52) U.S. Cl.
USPC ..................... 455/452.2; 455/450; 455/452.1; 455/456.1; 455/456.51
(58) Field of Classification Search
USPC .............. 455/450, 452.1–452.2, 456.1, 456.5
See application file for complete search history.

(56) References Cited

U.S. PATENT DOCUMENTS

| 5,530,912 | A  | * | 6/1996  | Agrawal et al. ............... 455/450 |
| 6,459,901 | B1 | * | 10/2002 | Chawla et al. ................ 455/450 |
| 6,522,888 | B1 | * | 2/2003  | Garceran et al. ........... 455/456.3 |
| 6,708,032 | B2 | * | 3/2004  | Willingham et al. ......... 455/436 |
| 2004/0179492 | A1 | * | 9/2004 | Zhang et al. .................. 370/331 |
| 2005/0096062 | A1 |   | 5/2005  | Ji et al. |
| 2009/0303938 | A1 | * | 12/2009 | Kim et al. ..................... 370/329 |

FOREIGN PATENT DOCUMENTS

JP    2005-151567    6/2005

OTHER PUBLICATIONS

International Search Report for PCT/JP2008/063192, mailed Sep. 9, 2008.

* cited by examiner

*Primary Examiner* — Patrick Edouard
*Assistant Examiner* — Matthew Genack
(74) *Attorney, Agent, or Firm* — Duane Morris LLP

(57) ABSTRACT

A radio base station includes: a communication quality detector (183) configured to detect communication quality in a subcarrier; a positional information acquisition unit (182) configured to acquire positional information indicating a position of a radio communication terminal at a time point when the communication quality is detected by the communication quality detector; subcarrier information table storage (185) configured to store a subcarrier information table including a subcarrier number, the communication quality, and the positional information, in association with one another; current positional information acquisition unit (180) configured to acquire current positional information indicating a current position of the radio communication terminal; and allocator (189) configured to allocate the communication channel to the radio communication terminal on the basis of the subcarrier information table and of the current positional information.

8 Claims, 8 Drawing Sheets

RADIO BASE STATION AND RADIO COMMUNICATION METHOD

CROSS-REFERENCE TO RELATED APPLICATIONS

This is a U.S. National Phase Application of International Application No. PCT/JP2008/063192 filed Jul. 23, 2008, which claims priority to Japanese Patent Application No. 2007-191167 filed Jul. 23, 2007, the disclosures of which are incorporated herein by reference in their entirety.

TECHNICAL FIELD

The present invention relates to a radio base station configured to communicate with a radio communication terminal, and a radio communication method used for the radio base station.

BACKGROUND ART

Adaptive modulation has heretofore been known as one of techniques to improve a communication speed in a radio communication system. In the adaptive modulation, a modulation method using a high communication rate is employed when a propagation path has a good condition while a modulation method using a low communication rate is employed when the transmission path has a bad condition.

To achieve this, in a radio communication system using the adaptive modulation, a radio communication terminal measures communication quality of radio communication with a radio base station and notifies the radio base station of the measured communication quality. The radio base station selects the modulation method depending on the communication quality notified by the radio communication terminal.

In the meantime, an orthogonal frequency division multiple access (OFDMA) scheme has been known as one of multicarrier communication schemes using numerous subcarriers. In the OFDMA scheme, subchannels (hereinafter referred to as "communication channels") each including multiple subcarriers are dynamically allocated to radio communication terminals.

In the radio communication system using the OFDMA scheme and the adaptive modulation, a different modulation method is applicable to each communication channel. Therefore, it is preferable that the radio base station allocates a communication channel having fine communication quality to the radio communication terminal out of communication channels which are allocatable to the radio communication terminal.

Meanwhile, the following method has been proposed as a technique which enables a communication channel having fine communication quality to be allocated to a radio communication terminal (see Patent Document 1, for example). Specifically, a radio communication terminal measures communication quality of a radio signal transmitted by a radio base station for each subcarrier and notifies the radio base station of the measured communication quality. The radio base station allocates a communication channel including a subchannel having fine communication quality to the radio communication terminal.

Patent Document 1: Japanese Patent Application Publication No. 2005-151567 (pp. 18-19, FIG. 7)

DISCLOSURE OF THE INVENTION

In a cell formed by the radio base station, communication quality of a specific communication channel may be deteriorated in an area interfered by an interference source (such as another radio base station) or in an area where there is an obstacle between the radio communication terminal and the radio base station. Moreover, communication quality of a radio communication terminal located in the neighborhood of the area where communication quality of a specific communication channel is deteriorated may be deteriorated when moving into the area.

According to the above-described channel allocation method, the radio base station may allocate a specific communication channel to the radio communication terminal located in the neighborhood of the area where the communication quality of the specific communication channel is deteriorated.

For this reason, the above-described channel allocation method has a problem that deterioration in the communication quality is apt to occur after the communication channel is allocated to the radio communication terminal when the cell includes the area where the communication quality of a specific communication channel is deteriorated.

Hence the present invention has been made to solve the foregoing problem and an object thereof is to provide a radio base station and a radio communication method to be used by the radio base station, which are capable of suppressing deterioration in communication quality when a cell includes an area where communication quality of a specific communication channel is deteriorated.

To solve the foregoing problem, the present invention has following characteristics. A first characteristic of the present invention is summarized as a radio base station (radio base station 10) configured to communicate with a radio communication terminal (radio communication terminals 20A to 20D), and the radio base station includes: a communication quality detector (communication quality detector 183) configured to detect communication quality in a communication channel (subchannel or subcarrier) allocatable to the radio communication terminal; a positional information acquisition unit (positional information acquisition unit 182) configured to acquire positional information indicating a position of the radio communication terminal at a time point when the communication quality is detected by the communication quality detector; a channel information storage (subcarrier information table storage 185) configured to store channel information (subcarrier information table) including a communication channel identifier (subcarrier number) to identify the communication channel, the communication quality detected by the communication quality detector, and the positional information acquired by the positional information acquisition unit, in association with one another; a current positional information acquisition unit (current positional information acquisition unit 180) configured to acquire current positional information indicating a current position of the radio communication terminal; and a communication channel allocator (allocator 189) configured to allocate the communication channel to the radio communication terminal on the basis of the channel information stored by the channel information storage and of the current positional information acquired by the current positional information acquisition unit. The communication channel allocator includes: a difference calculator (difference calculator 186) configured to calculate a difference (degree of adjacency $A_{SCxx}$) between the positional information corresponding to predetermined communication quality in the channel information and the current positional information, for each communication channel; and an allocation controller (total value calculator 187, priority setting unit 188, and allocator 189) configured to allocate the communication channel to the radio communication terminal in accordance with the difference calculated by the difference calculator.

According to this aspect, the difference calculator calculates the difference between the positional information corresponding to the predetermined communication quality and the current positional information for each communication channel. In this way, a distance between a position where the communication quality becomes equivalent to the predetermined communication quality and a current position of the radio communication terminal is specified for each communication channel.

Moreover, the allocation controller allocates the communication channel suitable for the current position of the radio communication terminal to the radio communication terminal. in accordance with the difference (the distance) calculated by the difference calculator. Therefore, it is possible to allocate the communication channel in accordance with the distance between the position where the communication quality becomes equivalent to the predetermined communication quality and the current position of the radio communication terminal. Hence it is possible to suppress deterioration in communication quality when the cell includes the area where the communication quality of a specific communication channel is deteriorated.

A second characteristic of the present invention is according to the first characteristic of the present invention, and is summarized in that the difference calculator calculates the difference while defining the communication quality below a threshold as the predetermined communication quality. The allocation controller allocates the communication channel having the largest difference to the radio communication terminal.

A third characteristic of the present invention is according to the second characteristic of the present invention, and is summarized in that the communication channel allocator further comprises a priority setting unit (priority setting unit 188) configured to set up priorities for a plurality of the radio communication terminals in terms of the allocation of the communication channel. The difference calculator calculates a total value (total value $A_{PS01}$) of the differences in a plurality of the communication channels for each of the radio communication terminals. The priority setting unit sets up the highest priority for the radio communication terminal having the smallest total value.

A fourth characteristic of the present invention is according to the second characteristic of the present invention, and is summarized in that the radio base station further includes a radio communicator (receivers 13, demodulation decoding units 14, transmitters 15, modulation encoding units 16 and a transmission/reception controller 17) configured to communicate with the radio communication terminal in accordance with a multicarrier communication scheme (OFDMA scheme). The channel allocator allocates a plurality of subcarriers to the radio communication terminal as the communication channel. The channel information storage stores the communication quality detected by the communication quality detector and the positional information acquired by the positional information acquisition unit for each of the subcarriers. The difference calculator calculates the difference for each of the subcarriers. The allocation controller allocates a predetermined number of the subcarriers starting from the subcarrier having the largest difference to the radio communication terminal.

A fifth characteristic of the present invention is according to the fourth characteristic of the present invention, and is summarized in that the communication channel allocator allocates a plurality of subcarriers having continuous frequencies to the radio communication terminal as the communication channel.

A sixth characteristic of the present invention is according to the first characteristic of the present invention, and is summarized in that the radio base station further includes: a radio communicator (receivers 13, demodulation decoding units 14, transmitters 15, modulation encoding units 16 and a transmission/reception controller 17) configured to transmit and receive a radio signal to and from the radio communication terminal; and a measurement unit (measurement unit 181) configured to measure a direction where the radio communication terminal is located and a distance to the radio communication terminal on the basis of the radio signal. The positional information acquisition unit acquires the positional information on the basis of the direction and the distance measured by the measurement unit. The current positional information acquisition unit acquires the current positional information on the basis of the direction and the distance measured by the measurement unit.

A seventh characteristic of the present invention is according to the sixth characteristic of the present invention, and is summarized in that the radio base station further includes: an array antenna (array antenna ANT) including a plurality of antenna elements (antenna elements 11); and a directivity controller (transmission/reception controller 17) configured to align directivity of the array antenna with the direction where the radio communication terminal is located. The measurement unit measures the direction where the radio communication terminal is located on the basis of the directivity.

A eighth characteristic of the present invention is according to the sixth characteristic of the present invention, and is summarized in that the radio base station further includes: a transmission power controller (transmission/reception controller 17) configured to control transmission power of the radio signal transmitted by the radio communicator; and a timing adjuster (transmission/reception, controller 17) configured to adjust a timing when the radio signal is transmitted by the radio communicator and a timing when the radio signal is transmitted by the radio communication terminal. The measurement unit measures the distance to the radio communication terminal on the basis of any of the transmission power and amounts of adjustment of the timing.

A ninth characteristic of the present invention is summarized as a radio communication method used for a radio base station configured to communicate with a radio communication terminal, and the radio communication method includes the steps of: detecting communication quality in a communication channel allocatable to the radio communication terminal (step S12); acquiring positional information indicating a position of the radio communication terminal at a time point when the communication quality is detected in the step of detecting (step S13); storing channel information including a communication channel identifier to identify the communication channel, the communication quality detected by the step of detecting, and the positional information acquired by the step of acquiring, in association with one another (step S14); acquiring current positional information indicating a current position of the radio communication terminal (step S101); and allocating the communication channel to the radio communication terminal on the basis of the stored channel information and of the acquired current positional information (step S103). The step of allocating includes the steps of: calculating a difference between the positional information corresponding to predetermined communication quality in the channel information and the current positional information, for each communication channel (step S103); and allocating the communication channel to the radio communication terminal in accordance with the difference calculated in the step of calculating (step S103).

According to the present invention, it is possible to provide a radio base station and a radio communication method to be used by the radio base station, which are capable of suppressing deterioration in communication quality when a cell includes an area where communication quality of a specific communication channel is deteriorated.

BEST MODES FOR CARRYING OUT THE INVENTION

Figure 1:
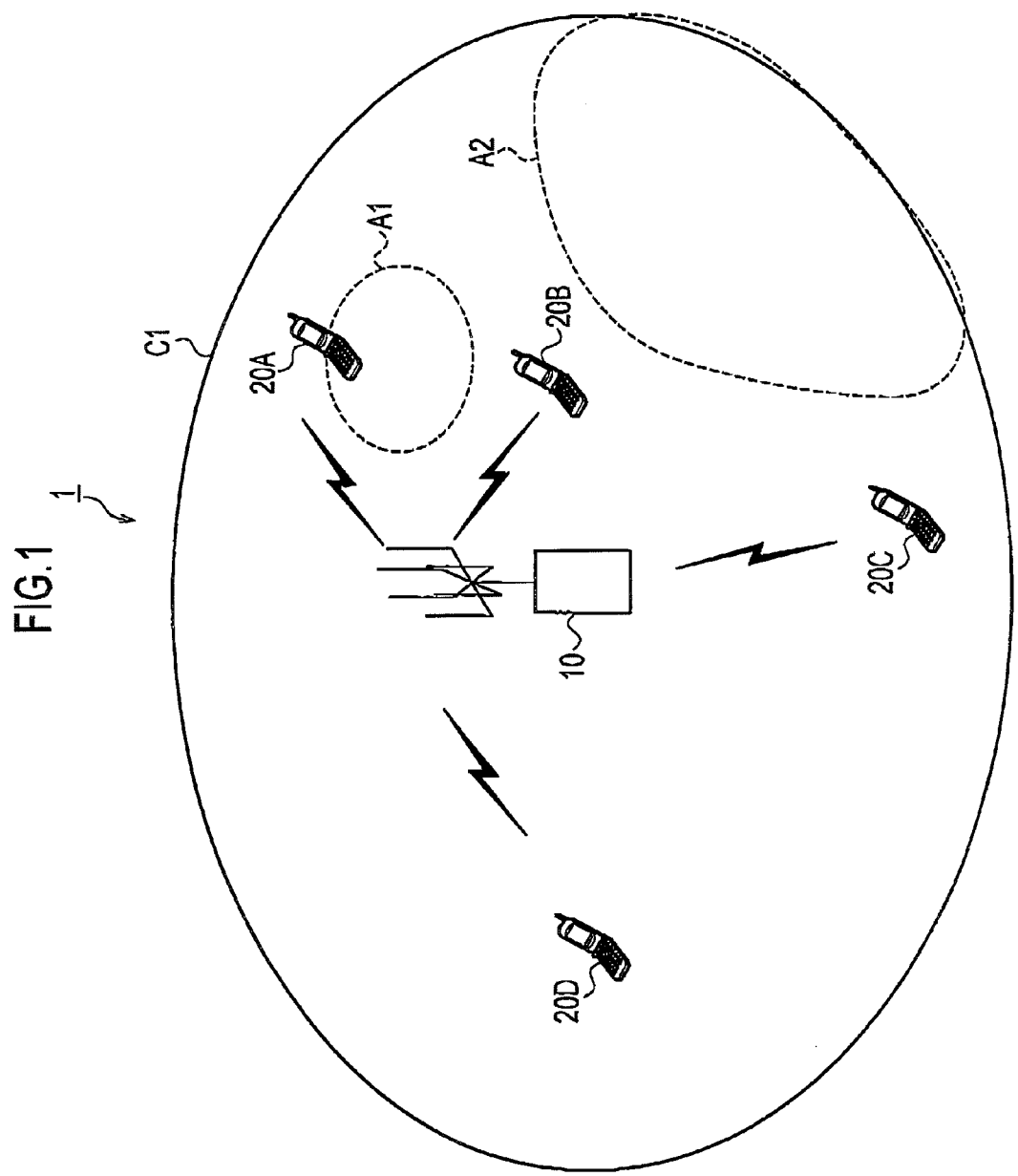
FIG. 1 is a schematic configuration diagram of a radio communication system according to an embodiment of the present invention.

Next, an embodiment of the present invention will be described with reference to the drawings. Specifically, (1) Overall schematic configuration, (2) Configuration of radio base station, (3) Operation of radio base station, and (4) Operation and effect will be described. In the following description of the drawings in conjunction with the embodiment, identical or similar constituents are designated by identical or similar reference numerals.

(1) Overall Configuration

First, a schematic configuration of a radio communication system according to this embodiment will be described by using FIG. 1 and FIG. 2.

(1.1) Configuration of Radio Communication System

FIG. 1 is a schematic configuration diagram of a radio communication system 1 according to this embodiment. As shown in FIG. 1, the radio communication system 1 includes a radio base station 10 and radio communication terminals 20A to 20D.

In this embodiment, the radio base station 10 and the radio communication terminals 20A to 20D include configurations based on IEEE 802.16e (the WiMAX; a registered trademark). Specifically, the radio base station 10 and the radio communication terminals 20A to 20D support the OFDMA scheme and adaptive modulation coding (AMC).

The radio base station 10 includes an array antenna ANT (see FIG. 3) and performs adaptive array control using the array antenna ANT. To be more precise, the radio base station 10 aligns directivity of the array antenna ANT with directions of the radio communication terminals 20A to 20D and communicates with the radio communication terminals 20A to 20D.

The radio communication terminals 20A to 20D measure quality of a radio signal transmitted by the radio base station 10 for each subchannel. For example, the radio communication terminals 20A to 20D measure a CNR, a SNR or a FER of the radio signal transmitted by the radio base station 10.

The radio base station 10 selects a modulation method and an encoding scheme in accordance with the communication quality notified from the radio communication terminals 20A to 20D.

When the communication quality of the subchannel used for communication with the radio base station 10 falls below a value which disables the communication with the radio base station 10, the radio communication terminals 20A to 20D notify the radio base station 10 of error information indicating deterioration in the subchannel.

When the error information is notified, the radio base station 10 detects a subcarrier included in the subchannel on which the error information is notified, and a position of the radio communication terminal notifying the error information.

The radio base station 10 stores a subcarrier information table T1 (see FIG. 5) which associates positional information indicating the detected position with a subcarrier number of the subcarrier included in the subchannel on which the error information is notified.

In the example of FIG. 1, in a cell (a service area) C1 formed by the radio base station 10, there are areas A1 and A2 in which communication quality of specific subcarriers is deteriorated.

As an example, in the area A1, there is an obstacle between the radio communication terminal 20A and the radio base station 10 and communication quality of subcarriers in a range of subcarrier numbers from 1 to 300 out of total number of subcarriers 1024 is deteriorated. Meanwhile, in an area A2, communication quality of subcarriers in a range of subcarrier numbers from 200 to 500 is deteriorated by an interference from a cell adjacent to the cell C1.

(1.2) Configuration of Communication Frame

Figure 2:
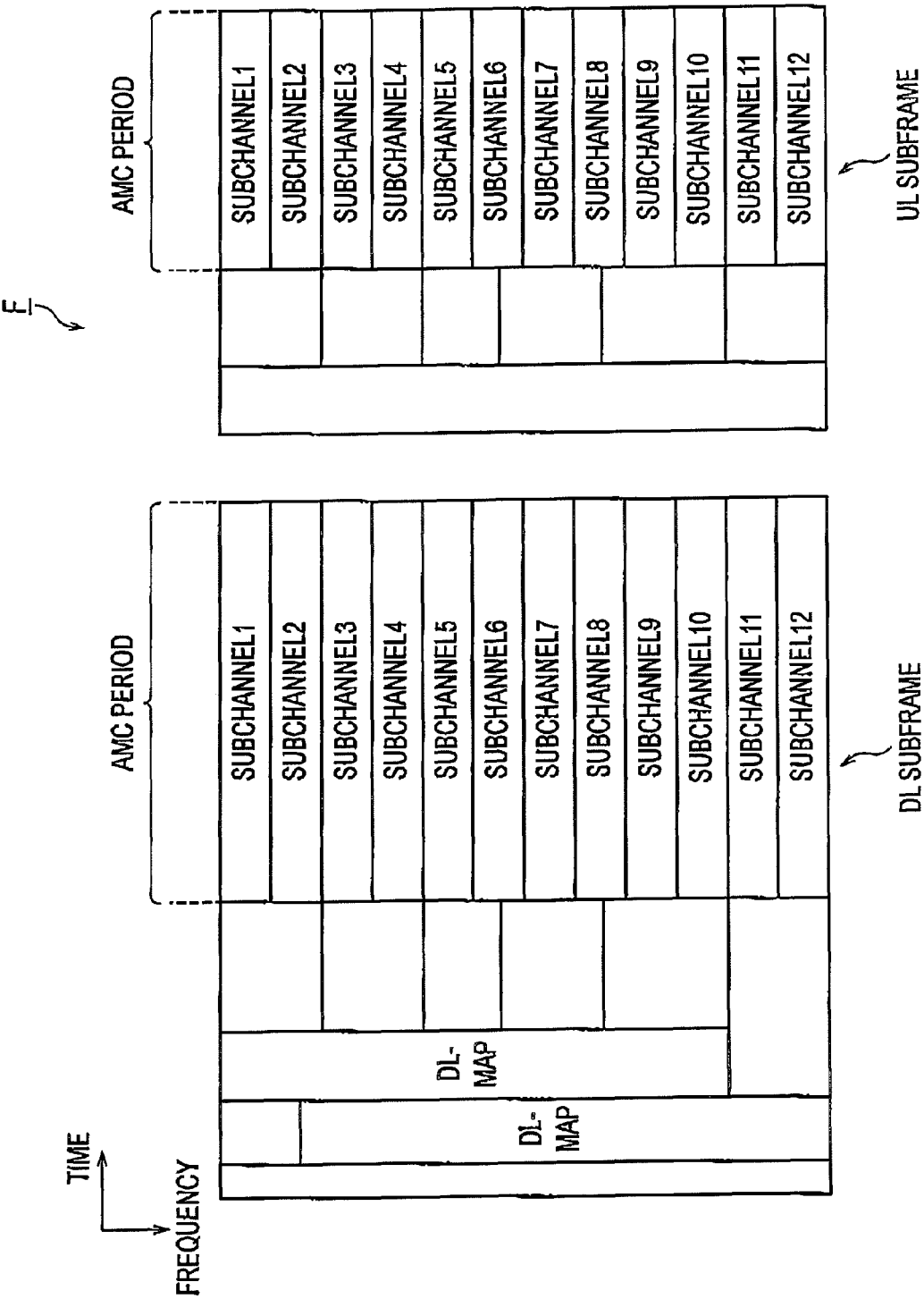
FIG. 2 is a view showing a configuration example of a communication frame when using AMC in the WiMAX.

FIG. 2 is a view showing a configuration example of a communication frame when using the AMC in the WiMAX.

As shown in FIG. 2, a communication frame F includes a DL subframe used for downlink (DL) communication and an UL subframe used for uplink (UL) communication.

The DL subframe and the UL subframe are provided in a time division fashion within one-frame period. Specifically, a TDD (time division duplex) scheme is applied hereto and the DL communication and the UL communication are carried out in different time slots.

Moreover, each of the DL subframe and the UL subframe has a period for using the AMC (hereinafter referred to as an "AMC period"). In the example of FIG. 2, the AMC period includes 12 subchannels divided to have a certain frequency band width.

Specifically, when using the AMC in the WiMAX, the subchannels are formed of multiple subcarriers having continuous frequencies. In the WiMAX, the subchannels to which the AMC is applied are called as "bands".

A subchannel 1 in the DL subframe and a subchannel 1 in the UL subframe are formed into a pair and allocated to one radio communication terminal. The same applies to subchannels 2 to 12.

Here, the DL subframe includes a DL-MAP which is notification information to be notified to the radio communication terminals 20A to 20D. The DL-MAP includes subchannel allocation information.

(2) Configuration of Radio Base Station

Next, a configuration of the radio base station 10 will be described by using FIG. 3 to FIG. 5.

(2.1) Schematic Configuration of Radio Base Station

Figure 3:
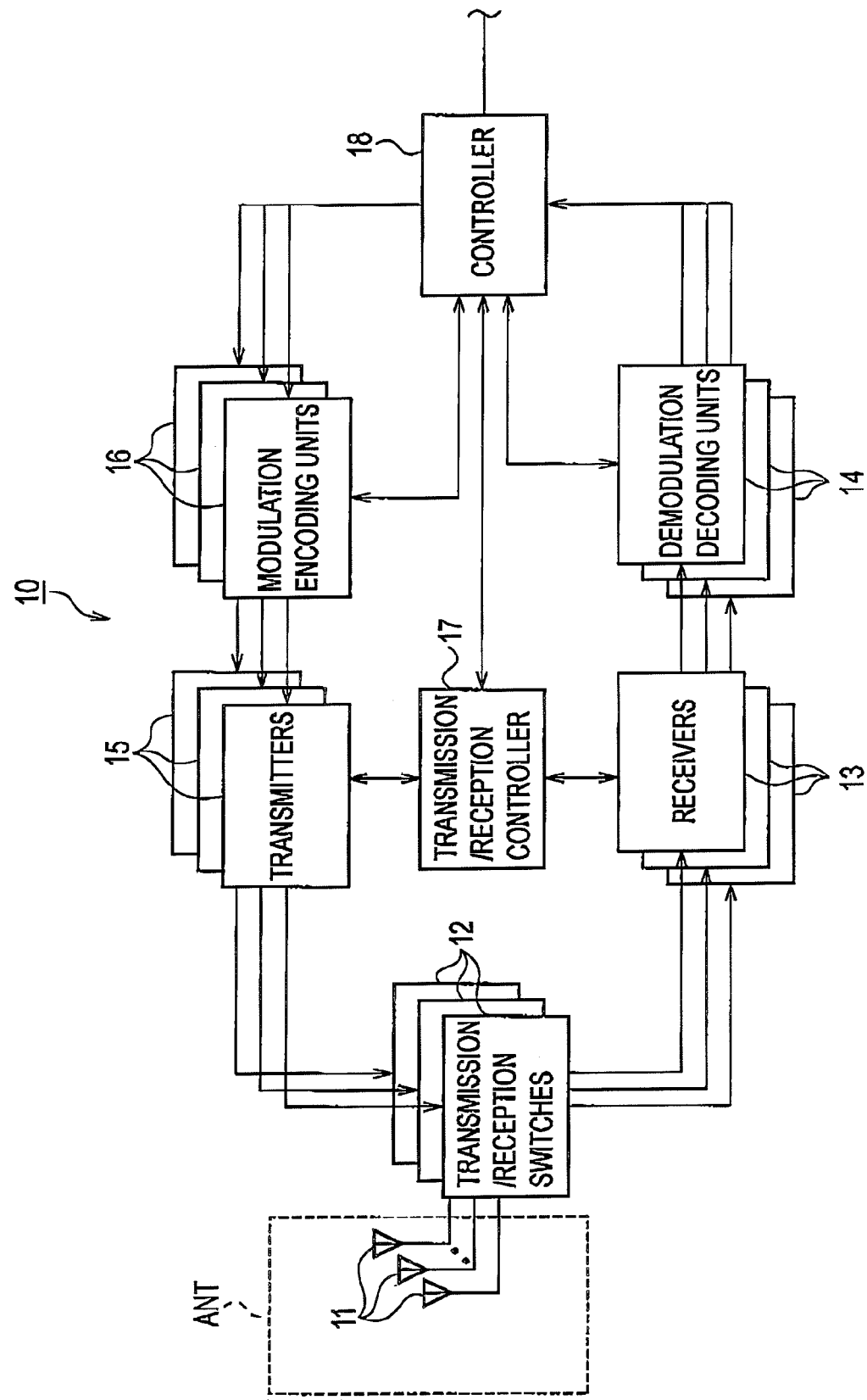
FIG. 3 is a schematic configuration diagram of a radio base station according to the embodiment of the present invention.

FIG. 3 is a schematic configuration diagram of the radio base station 10. As shown in FIG. 3, the radio base station 10 includes the array antenna ANT, transmission/reception switches 12, receivers 13, demodulation decoding units 14, transmitters 15, modulation encoding units 16, a transmission/reception controller 17, and a controller 18.

The array antenna ANT includes multiple antenna elements 11. The transmission/reception switch 12 switches between a transmission timing and a reception timing at the radio base station 10. Specifically, the transmission/reception switch 12 transmits a radio signal from the transmitter 15 to the array antenna ANT at the transmission timing. Meanwhile, the transmission/reception switch 12 transmits a radio signal from the array antenna ANT to the receiver 13 at the reception timing.

The receiver 13 performs reception processing of the radio signal transmitted by the transmission/reception switch 12 and outputs a reception signal. To be more precise, the receiver 13 includes a low noise amplifier (LNA) configured to amplify the radio signal and a down converter configured to convert the frequency of the radio signal into a lower frequency.

The demodulation decoding unit 14 subjects the reception signal outputted from the receiver 13 to OFDMA demodulation and decoding. The reception signal after demodulation and decoding is inputted to the controller 18.

Meanwhile, the modulation encoding unit 16 subjects a transmission signal from the controller 18 to encoding and OFDMA modulation.

The transmitter 15 performs transmission processing of the transmission signal after encoding and modulation and outputs the radio signal. To be more precise, the transmitter 15 includes an up-converter configured to convert the frequency of the transmission signal to a higher frequency and a power amplifier configured to amplify the radio signal.

The transmission/reception controller 17 controls the receivers 13 and the transmitters 15. In this embodiment, the transmission/reception controller 17 constitutes a directivity controller configured to align the directivity of the array antenna ANT with the directions of the radio communication terminals 20A to 20D. Specifically, the transmission/reception controller 17 controls phases and amplitudes of the radio signals by multiplying a weight by the radio signals transmitted from and received by each of antenna elements 11.

Meanwhile, in this embodiment, the transmission/reception controller 17 constitutes a transmission power controller configured to control transmission power of the radio signals. Specifically, the transmission/reception controller 17 performs transmission power control in order to maintain reception levels at the radio communication terminals 20A to 20D to predetermined values.

Further, in this embodiment, the transmission/reception controller 17 constitutes a timing adjuster configured to adjust a timing when the radio signal is transmitted by the transmitter 15 and a timing when the radio signal is transmitted by any of the radio communication terminals 20A to 20D.

A transmission delay of the radio signal varies depending on a distance between the radio base station 10 and any of the radio communication terminals 20A to 20D. For this reason, the transmission/reception controller 17 executes timing adjustment processing (ranging processing) in order to correct a timing error attributable to the transmission delay.

The controller 18 controls the demodulation decoding units 14, the modulation encoding units 16, and the transmission/reception controller 17. Now, a detailed configuration of the controller 18 will be described below.

(2.2) Detailed Configuration of Radio Base Station

Figure 4:
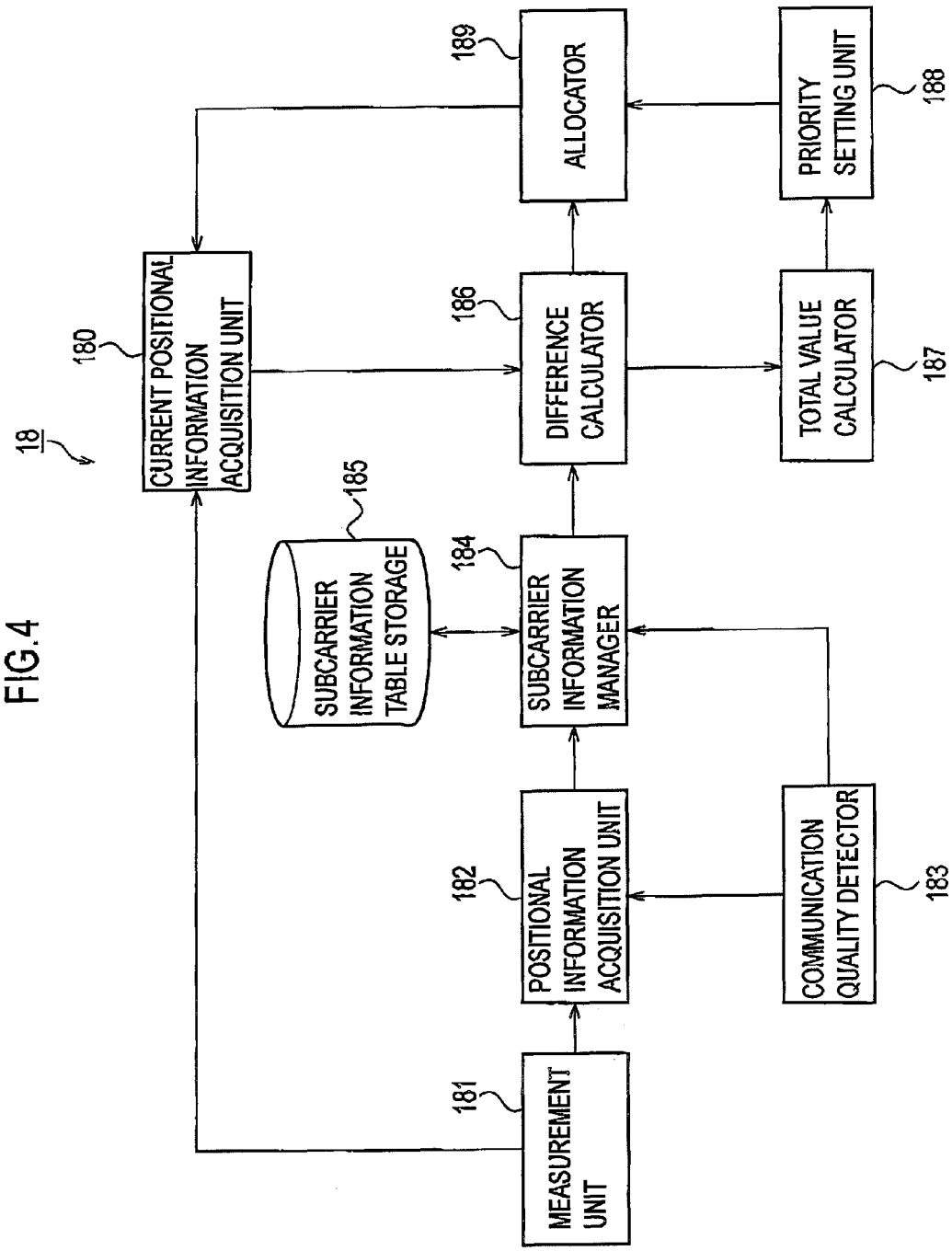
FIG. 4 is a detailed configuration diagram of the radio base station according to the embodiment of the present invention.

FIG. 4 is a view showing a detailed configuration of the radio base station 10, or more specifically, a functional block configuration diagram of the controller 18. In the following, points related to the present invention will be mainly described.

As shown in FIG. 4, the controller 18 includes a current positional information acquisition unit 180, a measurement unit 181, a positional information acquisition unit 182, a communication quality detector 183, a subcarrier information manager 184, a subcarrier information table storage 185, a difference calculator 186, a total value calculator 187, a priority setting unit 188, and an allocator 189.

The measurement unit 181 measures directions where the radio communication terminals 20A to 20D are located and distances between the radio base station 10 and the radio communication terminals 20A to 20D on the basis of information acquired from the transmission/reception controller 17. To be more precise, the measurement unit 181 measures the directions where the radio communication terminals 20A to 20D are located on the basis of the directivity (such as a phase synthesis pattern) of the array antenna ANT.

Moreover, the measurement unit 181 measures the distances between the radio base station 10 and the radio communication terminals 20A to 20D on the basis of transmission power values or timing adjustment amounts. Specifically, the distances between the radio base station 10 and the radio communication terminals 20A to 20D are longer as the transmission power values or the timing adjustment amounts are greater.

The communication quality detector 183 detects deterioration in the communication quality of the subchannels allocated to the radio communication terminals 20A to 20D on the basis of the error information received from the radio communication terminals 20A to 20D.

The positional information acquisition unit 182 acquires positional information which indicates the position of the radio communication terminal at a time point when deterioration in the communication quality is detected by the communication quality detector 183. To be more precise, the positional information acquisition unit 182 acquires the positional information on the basis of direction data and distance data measured by the measurement unit 181.

The subcarrier information table storage 185 stores the subcarrier information table T1 which associates the subcarrier number of each subcarrier included in the subchannel on which deterioration in the communication quality is detected with the position where deterioration in the communication quality is detected (hereinafter referred to as a "position of quality deterioration" as appropriate).

The subcarrier information manager 184 accumulates and updates the subcarrier information table T1 on the basis of the positional information acquired by the positional information acquisition unit 182 and communication quality deterioration information for each subcarrier detected by the communication quality detector 183.

When a subchannel is allocated to at least one of the radio communication terminals 20A to 20D, the allocator 189 instructs the current positional information acquisition unit 180 to acquire current positional information indicating a current position of the radio communication terminal to which the subchannel is allocated.

Here, allocation of the subchannel is not limited to a case when the radio communication terminal that newly starts communication requests allocation of the subchannel. It is also possible to reallocate the subchannel to the radio communication terminal to which another subchannel has been allocated already.

Upon receipt of an instruction to acquire the current positional information from the allocator 189, the current positional information acquisition unit 180 acquires the current positional information of the radio communication terminal to which the subchannel is allocated on the basis of the direction data and the distance data measured by the measurement unit 181.

Here, an xy plane is defined while setting the radio base station 10 as a point of origin. Assuming that the direction of the radio communication terminal to which the subchannel is allocated is $\phi_{PS1}$ and that the distance between the radio communication terminal and the radio base station 10 is $L_{PS1}$, the position (the current position) of the radio communication terminal can be expressed as follows:

$$(L_{PS1} \cos \phi_{PS1}, L_{PS1} \sin \phi_{PS1}) \quad (1)$$

Meanwhile, the subcarrier information manager 184 reads the subcarrier information table T1 out of the subcarrier information table storage 185 and transmits the subcarrier information table T1 thus read out to the difference calculator 186.

The difference calculator 186 calculates a difference between each piece of positional information included in the subcarrier information table T1 and the current positional information for each subcarrier.

Here, assuming that the direction of the radio communication terminal at the point when deterioration in the communication quality was detected in the past is $\phi_{NG1}$ and that the distance between the radio communication terminal and the radio base station 10 at then is $L_{NG1}$, the position of quality deterioration can be expressed as follows:

$$(L_{NG1} \cos \phi_{NG1}, L_{NG1} \sin \phi_{NG1}) \quad (2)$$

Thereafter, the difference calculator 186 calculates a degree of adjacency A between the current position of the radio communication terminal to which the subchannel is allocated and the position of quality deterioration. A degree of adjacency $A_{SCxx}$ concerning a certain subcarrier is calculated in accordance with the following formula:

$$A_{SCxx} = \{(L_{PSx} \cos \phi_{PSx} - L_{NGx} \cos \phi_{NGx})^2 + (L_{PSx} \sin \phi_{PSx} - L_{NGx} \sin \phi_{NGx})^2\} \quad (3)$$

The current position of the radio communication terminal to which the subchannel is allocated is closer to the position of quality deterioration as the degree of adjacency $A_{SCxx}$ is smaller.

Here, the difference calculator 186 allocates a predetermined largest value (such as a squared value of a cell diameter) to a subcarrier on which no deterioration in the communication quality is detected. Meanwhile, when there are multiple positions of quality deterioration in one subcarrier, the difference calculator 186 calculates the respective degrees of adjacency and selects the smallest value out of the calculated degrees of adjacency.

The total value calculator 187 acquires the degrees of adjacency A calculated for the respective subcarriers by the difference calculator 186 and then calculates a total value of the degrees of adjacency $A_{PS01}$ for all the subcarriers in accordance with the following formula:

$$A_{PS01} = A_{SC01} + A_{SC02} + A_{SC03} + \ldots + A_{SCxx} \quad (4)$$

When there are multiple radio communication terminals subject to allocation of the subchannels, the total value calculator 187 calculates the total values of the degrees of adjacency for the respective radio communication terminals. The radio communication terminal having the smaller calculated total value has more positions of quality deteriorations in the surroundings.

The priority setting unit 188 sets up a higher priority of allocation of the subchannel to the radio communication terminal having the smaller total value calculated by the total value calculator 187.

The allocator 189 organizes the subchannels on the basis of the degrees of adjacency calculated by the difference calculator 186 and on the priorities set up by the priority setting units 188. To be more precise, the allocator 189 compares the degrees of adjacency which are calculated for the respective subcarriers and organizes the subchannels by using a predetermined number of subcarriers starting from the subcarrier having the largest degree of adjacency to the radio communication terminal The allocator 189 allocates the subchannels thus organized to the radio communication terminals 20A to 20D. In this way, the subcarrier having no positions of quality deterioration in the cell C1 or the subcarrier having the position of quality deterioration located far from the radio communication terminal is allocated to each of the radio communication terminals.

(2.3) Table Configuration Example

Figure 5:
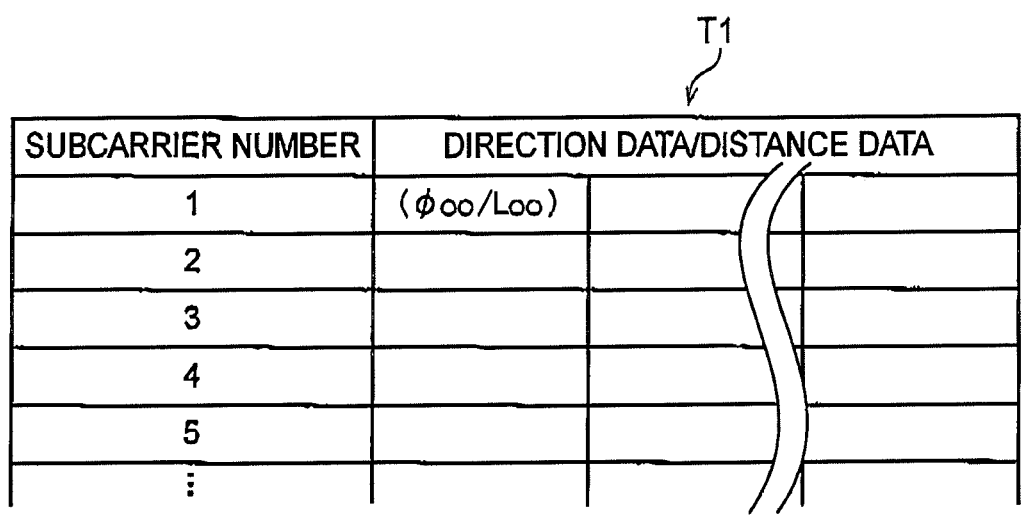
FIG. 5 is a view showing a configuration example of a subcarrier information table to be stored by the radio base station according to the embodiment of the present invention.

FIG. 5 is a view showing a configuration example of the subcarrier information table T1 to be stored by the subcarrier information table storage 185.

The example that the direction data and the distance data of the radio communication terminals are stored in the subcarrier information table T1 as the positional information is shown herein. The phase synthesis pattern of the array antenna ANT is stored as the direction data. The transmission power values (gain control values of the power amplifiers) or timing adjustment values (ranging values) are stored as the distance data.

(3) Operation of Radio Base Station

Next, an operation of the radio base station 10 will be described by using FIG. 6 and FIG. 7.

(3.1) Schematic Operation of Radio Communication System

Figure 6:
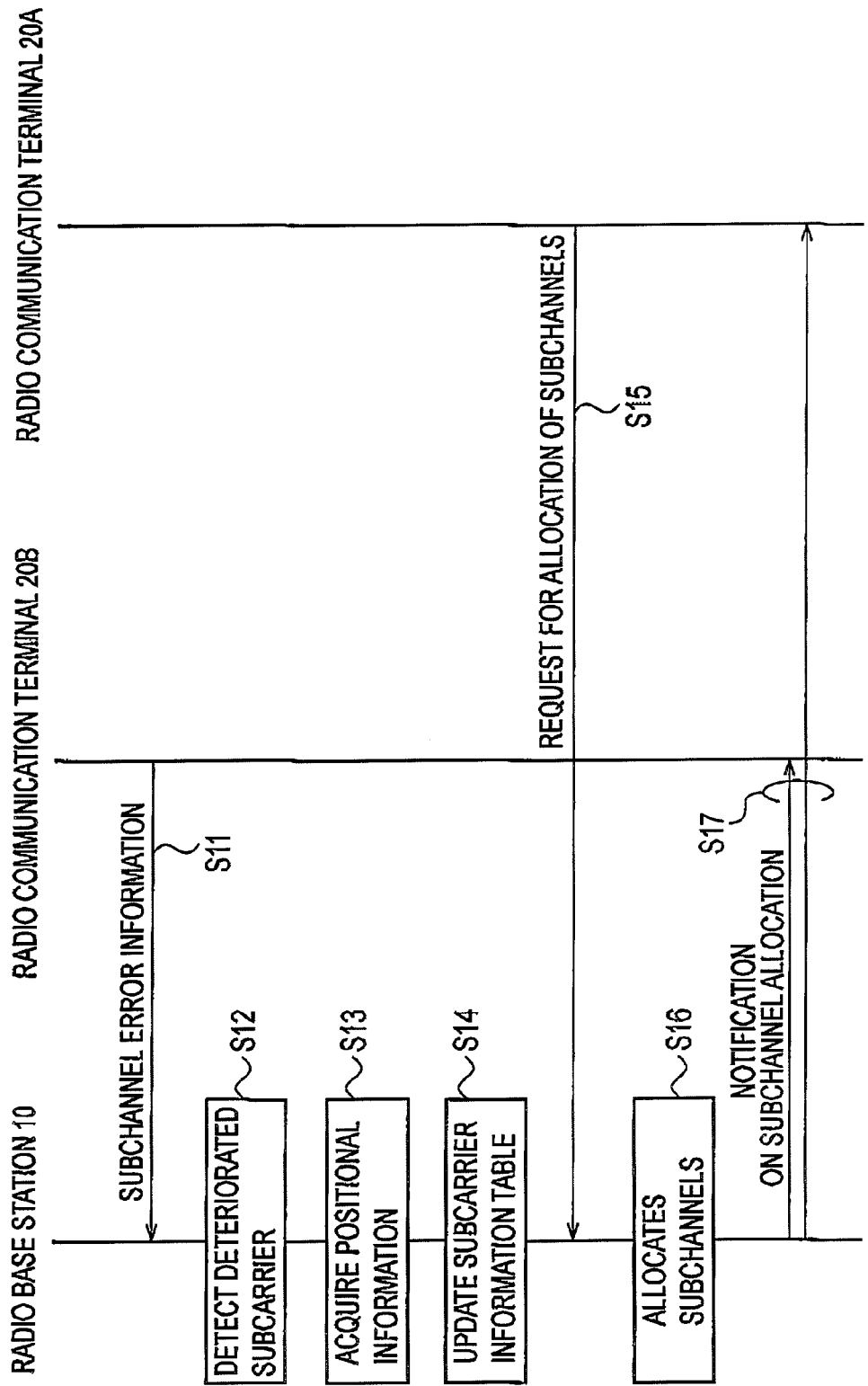
FIG. 6 is a sequence diagram showing an overall schematic operation example of the radio communication system according to the embodiment of the present invention.

FIG. 6 is a sequence diagram showing an overall schematic operation example of the radio communication system 1 including the radio base station 10. Here, descriptions will be given for an operation when the radio communication terminal 20A transmits a request for allocation of subchannels to the radio base station 10 after transmission of error information from the radio communication terminal 20B to the radio base station 10.

In step S11, the radio communication terminal 20B moves to an area A1 (an area in which communication quality of the subcarriers having subcarrier numbers 1 to 300 is deteriorated) and transmits the error information to the radio base station 10.

In step S12, the radio base station 10 detects deterioration in the communication quality of the respective subcarriers included in the subchannels allocated to the radio communication terminal 20B.

In step S13, the radio base station 10 acquires the positional information on the radio communication terminal 20B.

In step S14, the radio base station 10 updates the subcarrier information table T1 by use of the subcarrier numbers of the respective subcarriers detected to have deterioration in the communication quality in step S12 and by use of the positional information acquired in step S13.

In step S15, the radio communication terminal 20A transmits the request for allocation of the subchannels to the radio base station 10.

In step S16, the radio base station 10 allocates the subchannels to the radio communication terminals 20A and 20B. To be more precise, the radio base station 10 allocates the subchannels including the subcarriers other than the subcarriers having the subcarrier numbers from 1 to 300 to the radio communication terminal 20B located in the area A1 and to the radio communication terminal 20A located in the neighborhood of the area A1.

In step S17, the radio base station 10 notifies the radio communication terminals 20A and 20B of the subchannels allocated in step S16.

(3.2) Subchannel Allocation Operation

Figure 7:
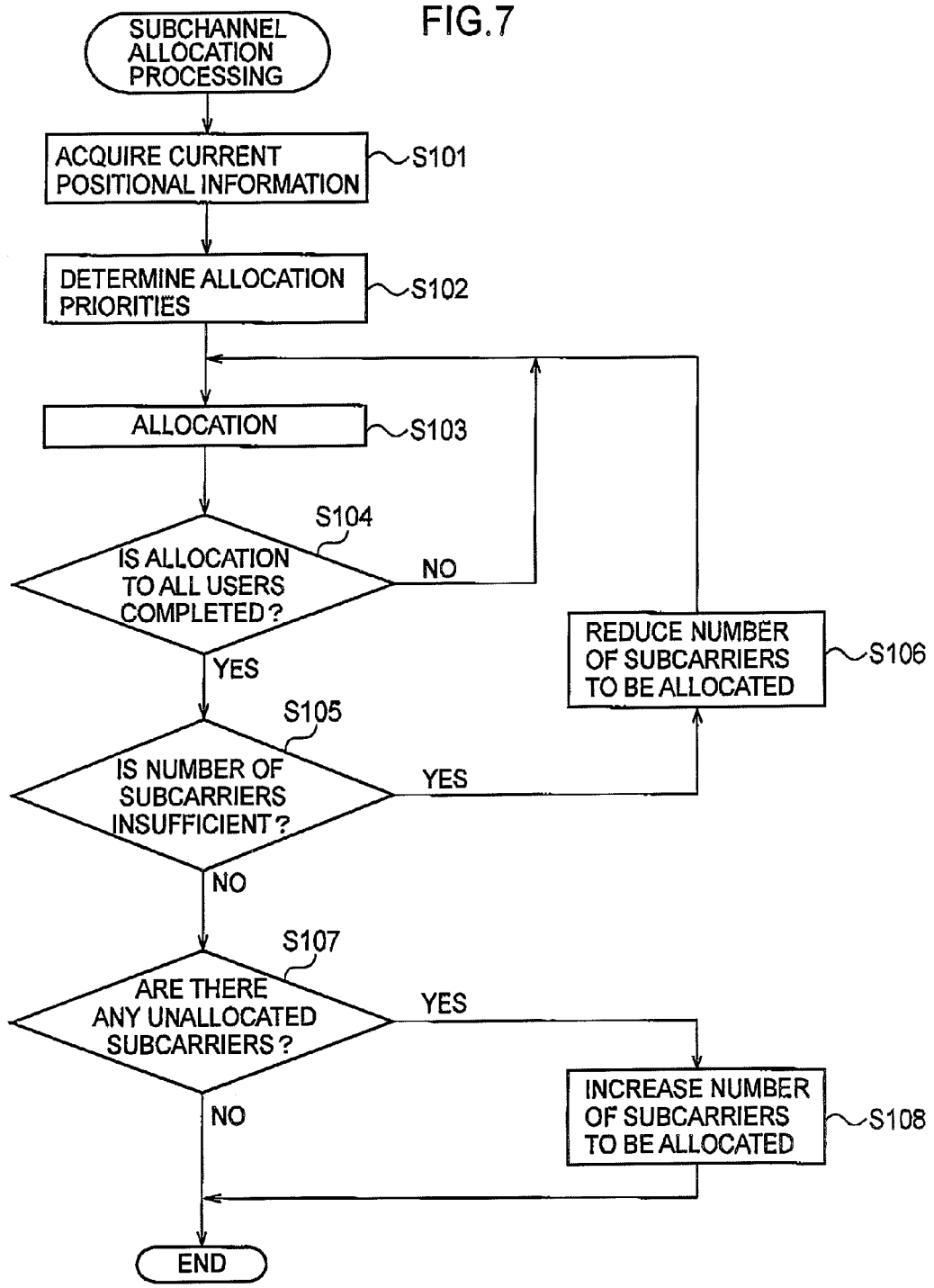
FIG. 7 is a flowchart showing an operation procedure example of a subchannel allocation operation to be executed by the radio base station according to the embodiment of the present invention.

FIG. 7 is a flowchart showing an operation procedure example of a subchannel allocation operation to be executed by the radio base station 10, or more specifically, a flowchart showing details of step S16 in FIG. 6.

Here, descriptions will be given for an operation when the radio base station 10 allocates (or reallocates) the subchannels respectively to the radio communication terminals 20A to 20D.

In step S101, the current positional information acquisition unit 180 acquires the current positional information on the radio communication terminals 20A to 20D. The difference calculator 186 and the total value calculator 187 calculate the total values $A_{PS01}$, $A_{PS02}$, $A_{PS03}$ and $A_{PS04}$ of the degrees of adjacency $A_{SCxx}$ concerning the respective subcarriers for each of the radio communication terminals 20A to 20D in accordance with the formula (3) and the formula (4).

In step S102, the priority setting unit 188 sets up the priorities of allocation of the subchannels to the radio communication terminals 20A to 20D on the basis of the total values $A_{PS01}$, $A_{PS02}$, $A_{PS03}$ and $A_{PS04}$ calculated in step S101.

In FIG. 1, for example, the priority of the radio communication terminal 20A located in the area A1 is set to the highest and the priority of the radio communication terminals 20B located in the neighborhood of the area A1 and the area A2 is set to the second highest. The priority of the radio communication terminal 20C located in the neighborhood of the area A2 is set to the third highest after the radio communication terminal 20B. As a consequence, the priority of the radio communication terminal 20D is set to the lowest.

In step S103, the allocator 189 allocates the subchannels to the radio communication terminals 20A to 20D in accordance with the priorities set up in step S102. Meanwhile, the allocator 189 allocates the subchannels in the order of decreasing distances between the current positions of the respective radio communication terminals 20A to 20D and the positions of quality deterioration on the respective subchannels.

To be more precise, the allocator 189 allocates the subchannels including the subcarriers other than the subcarriers having the subcarrier numbers from 1 to 300 preferentially to the radio communication terminal 20A located in the area A1 (the area in which the communication quality of the subcarriers having the subcarrier numbers 1 to 300 is deteriorated).

Meanwhile, the allocator 189 allocates the subchannels including the subcarriers other than the subcarriers having the subcarrier numbers from 1 to 500 preferentially to the radio communication terminal 20B located in the neighborhood of the area A1 and the area A2 in which the communication quality of the subcarriers having the subcarrier numbers 200 to 500 is deteriorated (the area in which the communication quality of the subcarriers having the subcarrier numbers 200 to 500 is deteriorated).

The allocator 189 allocates the subchannels including the subcarriers other than the subcarriers having the subcarrier numbers from 200 to 500 preferentially to the radio communication terminal 20C located in the neighborhood of the area A2.

In step S104, the allocator 189 judges whether or not allocation to all users (the radio communication terminals) is completed. The process returns to step S103 if allocation to all the radio communication terminals is not completed. On the other hand, the process goes to step S105 when allocation to all the radio communication terminals is completed.

In step S105, the allocator 189 judges whether or not the number of the subcarriers to be allocated to the radio communication terminals 20A to 20D is insufficient. If the number of the subcarriers to be allocated to the radio communication terminals 20A to 20D is insufficient, the allocator 189 reduces the number of the subcarriers in each of the subchannels in step S106.

The process goes to step S107 when the number of the subcarriers to be allocated to the radio communication terminals 20A to 20D is not insufficient. In step S107, the allocator 189 judges whether or not there are any unallocated subcarriers. The process goes to step S108 if there is an unallocated subcarrier.

In step S108, the allocator 189 increases the number of subcarriers in each of the subchannels.

(4) Operation and Effect

As described above, according to this embodiment, the difference calculator 186 calculates the distances between the positions of quality deterioration and the current positions of the radio communication terminals 20A to 20D for each subcarrier. The allocator 189 performs the allocation to the radio communication terminals 20A to 20D while giving priority to the subcarriers having longer calculated distances.

Therefore, it is possible to suppress deterioration in the communication quality when the cell C1 includes the areas A1 and A2 in which the communication quality of specific subcarriers (or subchannels) is deteriorated.

According to this embodiment, the allocator 189 allocates the subchannels to the radio communication terminal, the subchannels including a predetermined number of subcarriers starting from the subcarrier having the largest distance between the position of quality deterioration and the current position of each of the radio communication terminals 20A to 20D to the radio communication terminal.

Therefore, after allocation of the subchannels, it is possible to further reduce a possibility of deterioration in the communication quality of the subchannels.

According to this embodiment, the total value calculator 187 sums up the distances between the positions of quality deterioration and the radio communication terminals 20A to 20D of all the subcarriers. The priority setting unit 188 sets up the highest priority for the radio communication terminal having the smallest total value.

Therefore, it is possible to allocate the subchannels preferentially to the radio communication terminal having many positions of quality deterioration in the neighborhood. In particular, when allocating a subchannel including subcarriers having continuous frequencies, it is possible to ensure the subcarriers having the continuous frequencies easily even when the radio communication terminal has a small number of allocatable subcarriers.

According to this embodiment, the measurement unit 181 measures the directions where the radio communication terminals 20A to 20D are located and the distances between the radio base station 10 and the radio communication terminals 20A to 20D on the basis of the radio signals received by the receiver 13 and on the radio signals transmitted by the transmitter 15.

Therefore, the radio base station 10 can acquire the positional information without providing each radio communication terminal with a position detection device such as a GPS.

According to this embodiment, the measurement unit 181 measures the directions where the radio communication terminals 20A to 20D are located on the basis of the directivity of the array antenna ANT. Therefore, it is possible to detect the directions of the radio communication terminals 20A to 20D at high accuracy.

According to this embodiment, the measurement unit 181 measures the distance to each of the radio communication terminals 20A to 20D on the basis of the transmission power value (the gain control value of the power amplifier) or on the timing adjustment amount (the ranging value). Therefore, it is possible to detect the distances with the radio communication terminals 20A to 20D at high accuracy.

OTHER EMBODIMENTS

Although the present invention has been described above with reference to the embodiment, it should not be understood that the statement and the drawings constituting part of this disclosure will limit this invention. From this disclosure, various alternative embodiments, examples, and operation techniques will become obvious to those skilled in the art.

In the above-described embodiment, the difference calculator 186 calculates the distances between the positions of quality deterioration and the current positions of the radio communication terminals 20A to 20D for each subcarrier and the allocator 189 performs the allocation to the radio communication terminals 20A to 20D while giving priority to the subcarriers having longer calculated distances.

However, the difference calculator 186 may calculate distances between positions of fine quality and the current positions of the radio communication terminals 20A to 20D for each subcarrier and the allocator 189 may perform the allocation to the radio communication terminals 20A to 20D while giving priority to the subcarriers having shorter calculated distances.

In the above-described embodiment, the radio communication terminals 20A to 20D notify the radio base station 10 of the error information. However, the radio communication terminals 20A to 20D may notify the radio base station 10 of the communication quality and the radio base station 10 may generate the error information by comparing the communication quality with a threshold.

Figure 8:
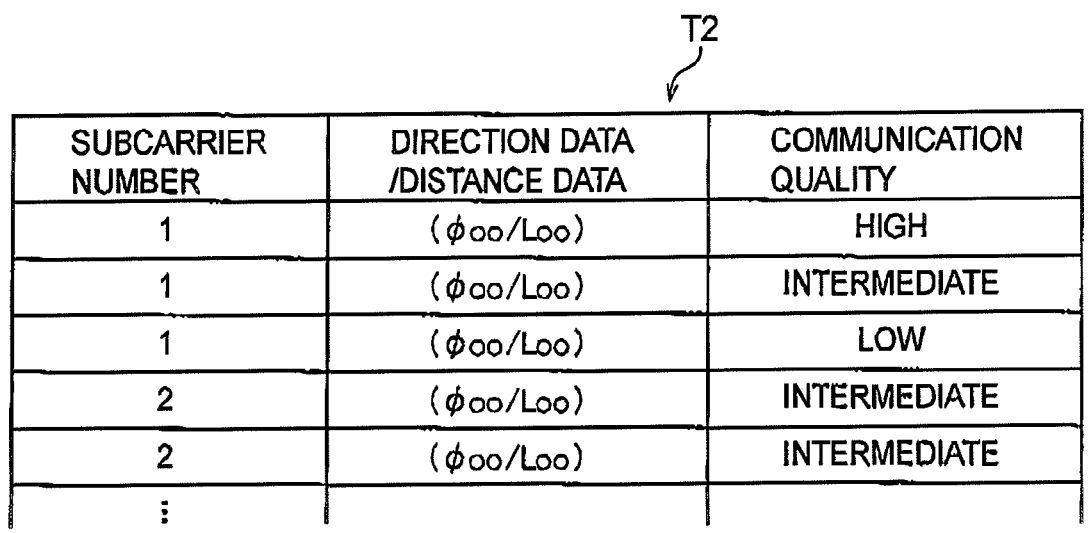
FIG. 8 is a view showing another configuration example of the subcarrier information table to be stored by the radio base station according to the embodiment of the present invention.

Meanwhile, in the above-described embodiment, the positions of quality deterioration are registered with the subcarrier information table T1. However, the subcarrier information table T1 may be configured in a way that the positional information of the radio communication terminals 20A to 20D and the communication quality are registered as shown in FIG. 8.

Moreover, instead of the configuration in which the communication quality and the positional information are managed for each subcarrier, a configuration may be implemented in which the communication quality and the positional information are managed for each subchannel. In this case, it is possible to reduce the amounts of information on the communication quality and on the positional information to be stored by the radio base station 10.

In the above-described embodiment, the positions of the radio communication terminals 20A to 20D are detected by the radio base station 10. However, when each of the radio communication terminals 20A to 20D includes a GPS, the radio communication terminals 20A to 20D may notify the radio base station 10 of the positional information detected by use of the GPS.

In the above-described embodiment, the radio communication system 1 employing the OFDMA scheme has been explained. However, instead of the OFDMA scheme, the FDMA (frequency division multiple access) scheme, the SDMA (space division multiple access) scheme, and so forth may be employed.

Accordingly, it is to be understood that the present invention encompasses various other embodiments which are not described herein. Therefore, the present invention will only be limited by the specific subject matters of the invention according to the scope of the invention as defined by the appended claims appropriate for this disclosure.

INDUSTRIAL APPLICABILITY

As described above, a radio base station and a radio communication method according to the present invention are capable of suppressing deterioration in communication quality when a cell includes an area where communication quality of a specific communication channel is deteriorated and are therefore useful for radio communication such as mobile communication.

The invention claimed is:

1. A radio base station configured to communicate with a radio communication terminal, comprising:
   a communication quality detector configured to detect communication quality in a communication channel allocatable to the radio communication terminal;
   a positional information acquisition unit configured to acquire positional information indicating a position of the radio communication terminal at a time point when the communication quality is detected by the communication quality detector;
   a channel information storage configured to store channel information including a communication channel identifier to identify the communication channel, the communication quality detected by the communication quality detector, and the positional information acquired by the positional information acquisition unit, in association with one another;
   a current positional information acquisition unit configured to acquire current positional information indicating a current position of the radio communication terminal, the current positional information used for calculating a distance between the current position and a position indicated by the positional information when a communication channel is allocated; and
   a communication channel allocator configured to allocate the communication channel to the radio communication terminal on the basis of the channel information stored by the channel information storage and of the current positional information acquired by the current positional information acquisition unit, wherein
   the communication channel allocator includes:
   a difference calculator configured to calculate a distance between the position indicated by the positional information corresponding to predetermined communication quality in the channel information and current position indicated by the current positional information, for each communication channel, wherein the difference calculator calculates the distance while defining the communication quality below a threshold as the predetermined communication quality;
a priority setting unit configured to set up priorities for a plurality of the radio communication terminals in terms of the allocation of the communication channel; and
an allocation controller configured to allocate the communication channel to the radio communication terminal in accordance with the distance calculated by the difference calculator, wherein the allocation controller allocates the communication channel having the largest distance to the radio communication terminal.

2. The radio base station according to claim 1, wherein
the communication channel allocator further comprises a priority setting unit configured to set up priorities for a plurality of the radio communication terminals in terms of the allocation of the communication channel,
the difference calculator calculates a total value of the distances in a plurality of the communication channels for each of the radio communication terminals, and
the priority setting unit sets up the highest priority for the radio communication terminal having the smallest total value.

3. The radio base station according to claim 1, further comprising a radio communicator configured to communicate with the radio communication terminal in accordance with a multicarrier communication scheme, wherein
the channel allocator allocates a plurality of subcarriers to the radio communication terminal as the communication channel,
the channel information storage stores the communication quality detected by the communication quality detector and the positional information acquired by the positional information acquisition unit for each of the subcarriers,
the difference calculator calculates the distance for each of the subcarriers, and
the allocation controller allocates a predetermined number of the subcarriers starting from the subcarrier having the largest distance to the radio communication terminal.

4. The radio base station according to claim 3, wherein
the communication channel allocator allocates a plurality of subcarriers having continuous frequencies to the radio communication terminal as the communication channel.

5. The radio base station according to claim 1, further comprising:
a radio communicator configured to transmit and receive a radio signal to and from the radio communication terminal; and
a measurement unit configured to measure a direction where the radio communication terminal is located and a distance to the radio communication terminal on the basis of the radio signal, wherein
the positional information acquisition unit acquires the positional information on the basis of the direction and the distance to the radio communication terminal measured by the measurement unit, and
the current positional information acquisition unit acquires the current positional information on the basis of the direction and the distance to the radio communication terminal measured by the measurement unit.

6. The radio base station according to claim 5, further comprising:
an array antenna including a plurality of antenna elements; and
a directivity controller configured to align directivity of the array antenna with the direction where the radio communication terminal is located, wherein
the measurement unit measures the direction where the radio communication terminal is located on the basis of the directivity.

7. The radio base station according to claim 5, further comprising:
a transmission power controller configured to control transmission power of the radio signal transmitted by the radio communicator; and
a timing adjuster configured to adjust a timing when the radio signal is transmitted by the radio communicator and a timing when the radio signal is transmitted by the radio communication terminal, wherein
the measurement unit measures the distance to the radio communication terminal on the basis of any of the transmission power and amounts of adjustment of the timing.

8. A radio communication method used for a radio base station configured to communicate with a radio communication terminal, comprising the steps of:
detecting communication quality in a communication channel allocatable to the radio communication terminal;
acquiring positional information indicating a position of the radio communication terminal at a time point when the communication quality is detected in the step of detecting;
storing channel information including a communication channel identifier to identify the communication channel, the communication quality detected by the step of detecting, and the positional information acquired by the step of acquiring, in association with one another;
acquiring current positional information indicating a current position of the radio communication terminal, the current positional information used for calculating a distance between the current position and a position indicated by the positional information when a communication channel is allocated; and
allocating the communication channel to the radio communication terminal on the basis of the stored channel information and of the acquired current positional information, wherein the step of allocating includes the steps of:
calculating a distance between the position indicated by positional information corresponding to predetermined communication quality in the channel information and the current position of the radio communication terminal indicated by positional information, for each communication channel, while defining the communication quality below a threshold as the predetermined communication quality;
setting up priorities for a plurality of the radio communication terminals in terms of the allocation of the communication channel and
allocating the communication channel having the largest distance to the radio communication terminal to the radio communication terminal in accordance with the distance calculated in the step of calculating.

* * * * *